United States Patent [19]

Kobayashi et al.

[11] 4,219,883
[45] Aug. 26, 1980

[54] CACHE MEMORY CONTROL SYSTEM

[75] Inventors: Yoshiuki Kobayashi, Kokubunji; Takashi Rokutanda, Iachikawa, both of Japan

[73] Assignee: Tokyo Shibaura Denki Kabushiki Kaisha, Kawasaki, Japan

[21] Appl. No.: 22,950

[22] Filed: Mar. 22, 1979

[30] Foreign Application Priority Data

Mar. 30, 1978 [JP] Japan .................................. 53/36090

[51] Int. Cl.² ............................................. G11C 13/00
[52] U.S. Cl. ..................................... 365/189; 365/49
[58] Field of Search ................... 365/189, 49, 230, 233

[56] References Cited

U.S. PATENT DOCUMENTS 3,821,724  6/1974  Warner .................................. 365/78

OTHER PUBLICATIONS

Japanese Patent Publication No. 43-4011 "Information Memory Device" published Feb. 14, 1968.

Japanese Patent Publication No. 48-3445 "Memory System" published Jan. 31, 1973.

Primary Examiner—Terrell W. Fears
Attorney, Agent, or Firm—Kenyon & Kenyon

[57] ABSTRACT

Block information from a main memory, which is registered in an address register, is applied to a directory. A bank address in the main memory is taken out from the respective locations defined by the block information in each bank of the directory. A comparator compares the bank address with a bank address of the main memory registered in said address register. The output signal from the comparator is applied as a control signal to a control ROM. The directory memory applies an address signal to the control ROM. Upon the application of the address signal, the control ROM produces the contents (control information) of the location defined by the address signal and the contents is loaded into the directory memory. The control information determines the earliest used bank in the cache memory and determines the bank to which the contents of the main memory is loaded.

4 Claims, 18 Drawing Figures

| NO | INITIAL WRITE | ROM ADDRESS | | | | | | | | ROM DATA | | | | HIGHEST PRIORITY |
|---|---|---|---|---|---|---|---|---|---|---|---|---|---|---|
| | | A | B | C | 0 | 1 | 2 | 3 | 4 | 5 | 0 1 | 2 3 | 4 5 | |
| | 0 | 1 | 2 | 3 | 4 | 5 | 6 | 7 | 8 | | 0 1 | 2 3 | 4 5 | |
| 1 | 1 | * | * | * | * | * | * | * | * | | 0 0 | 0 1 | 1 0 | 1 1 |
| 2 | 0 | 0 | 0 | 0 | 0 | 0 | 1 | 1 | 0 | | 0 1 | 1 0 | 1 1 | 0 0 |
| 3 | 0 | 0 | 1 | 0 | 1 | 1 | 0 | 1 | 1 | | 1 0 | 1 1 | 0 0 | 0 1 |
| 4 | 0 | 1 | 0 | 1 | 0 | 1 | 1 | 0 | 0 | | 1 1 | 0 0 | 0 1 | 1 0 |
| 5 | 0 | 1 | 1 | 1 | 1 | 0 | 0 | 0 | 1 | | 0 0 | 0 1 | 1 0 | 1 1 |
| 6 | 0 | 0 | 0 | 0 | 0 | 0 | 1 | 1 | 0 | | 0 1 | 1 0 | 1 1 | 0 0 |

…

CACHE MEMORY CONTROL SYSTEM

BACKGROUND OF THE INVENTION

The invention relates to a cache memory control system.

The cache memory (often called a buffer memory) has widely been used in a large scale computer with a view to reduction of an effective access time to a main memory with a large memory capacity but with a long access time. The cache memory has recently been used frequently in the filed of a large scale minicomputer (called a mega minicomputer with a large memory capacity).

As shown in FIG. 1 illustrating a relationship between a main memory and a cache memory, the unitary data which is called a block is transferred between a main memory 102 and a cache memory 103. When a central processing unit (CPU) 101 requires data, necessary data is read out from a main memory 102 and then is stored in the cache memory 103. In this manner, an effective access time is reduced. In designing such a data processing system, the following items must be taken into consideration.

1. To optimize a block size including unnecessary data:

The ratio of the necessary data contained in a block to the unnecessary data contained therein must be minimized for securing the effective memory access.

2. To optimize the number of blocks required for CPU:

Since the memory capacity of the cache memory 103 is restrictive, the number of blocks to be stored in the cache memory 103 must be optimized for the same purpose.

3. When a new block is loaded into the cache memory 103, the optimum number of blocks must be pulled out from the cache memory 103.

4. The nature of a program:

In making an access to memory, addresses must be optimumly selected. A nature of a program that a certain routine must be executed repeatedly, for example, influences largely a frequency of block transfer.

Many attempts have been made to fully satisfy the just-mentioned items. One of them is disclosed in Japan Examined Patent Application No. 4011/43 of Showa (1968) entitled "Information Memory Apparatus" filed by IBM. The IBM patent uses a buffer memory between a main memory and CPU for storing a copy of the contents in the main memory. Another example is disclosed in Japan Examined Patent Application No. 3445/48 of Showa (1973) filed by the same applicant, in which describes the improvement of a data processing system with a memory hierarchy including a high speed buffer memory.

Those conventional apparatuses, however, still suffer from the following drawbacks; (a) The performance might be improved but the cost/performance is poor, (b) The economical improvement conversely deteriorates the system performance, and (c) The access method to the main memory of CUP (i.e. the nature of a program) is not optimized.

SUMMARY OF THE INVENTION

Accordingly, an object of the invention is to provide an effectively operable cache memory control system in which the handling of the cache memory data transfer for input and output devices is not effected by the cache memory is selected depending on the nature of a memory access request from CPU.

Another object of the invention is to provide a cache memory control system in which, when CPU makes an access to a fixed area of a main memory, the cache memory is not accessed by the control of zero detector.

Still another object of the invention is to provide a cache memory control system in which, when CPU makes an access to a main memory, if no data is stored in a cache memory, the data stored in the address specified is transferred from the main memory to CPU and then a block including the specified address is transferred to the cache memory.

Yet another object of the invention is to provide a cache memory control system in which the initialization of a main memory and a cache memory and the refresh control of a main memory are carried out by the same circuit.

An additional object of the invention is to provide a cache memory control system with the optimum block size of a block transferred from a main memory to a cache memory and with improved effective efficiency of the cache memory.

A further object of the invention is to provide a cache memory control system in which, when a new block is loaded into a cache memory, older blocks already stored therein are successively pulled out from the cache memory.

An even further object of the invention is to provide a cache memory control system with a control that the number of addresses responsive to an access request from CPU is as many as possible.

To achieve the above-mentioned objects, there is provided a cache memory control system for a data processing system with a memory system to be accessed by a central processing element and a high speed bus control circuit. The cache memory control system is comprised of: main memory means with a plurality of word locations addressable by addressing spectra in which the entire of the word locations are logically divided into a plurality of banks, each bank is divided into a plurality of blocks, each block is divided into a plurality of word locations, and each bank is specified by a bank address in the addressing spectra, each block by a block discriminator, and each word location by a block address; cache memory means with a plurality of word locations addressable by addressing spectra in which the entire of the word locations are logically divided into a plurality of banks corresponding to the respective banks in said main memory, each bank is divided into a plurality of blocks, each block is divided into a plurality of word locations, and each bank is specified by the bank address in the spectra, each block by the block discriminator, and each word location by the block address; random access directory memory means which is addressable by the bank address, is provided with a plurality of word locations corresponding to the banks in the cache memory, and loads the block discriminators of a plurality of blocks in the corresponding banks stored in the cache memory; a cache memory address bus connecting to the central processing element, the high speed bus control circuit, the cache memory and the directory memory, through which the address of a fetch request produced by the central processing element or the high speed bus control circuit is transferred; comparing means connecting to the directory memory and the address bus, which the comparing means compares a plurality of discriminators read out from the directory memory in response to the bank address of the fetch request with the block discriminator of the fetch request to produce a coincident or not-coincident signal for indicating whether the word to be fetched is stored in the cache memory; encoder means connecting to the comparing means for encoding the coincident not-coincident signals; a multiplexer connecting to the encoder for selecting the encoder signal; priority register means connecting to the directory memory for holding priority information produced from the directory memory; control ROM means connecting to the priority register for applying to the directory memory the directory memory bank information to which data is to be loaded, in response to the output signal from the priority register; and zero detecting means connecting to the address register for prohibiting block transfer from the main memory to the cache memory when memory address information fed from the address register specifies a fixed area in the main memory.

These and other objects and advantages of the invention will become more apparent upon a reading of the following detailed description and drawings, in which:

DESCRIPTION OF THE PREFERRED EMBODIMENTS

Figure 1:
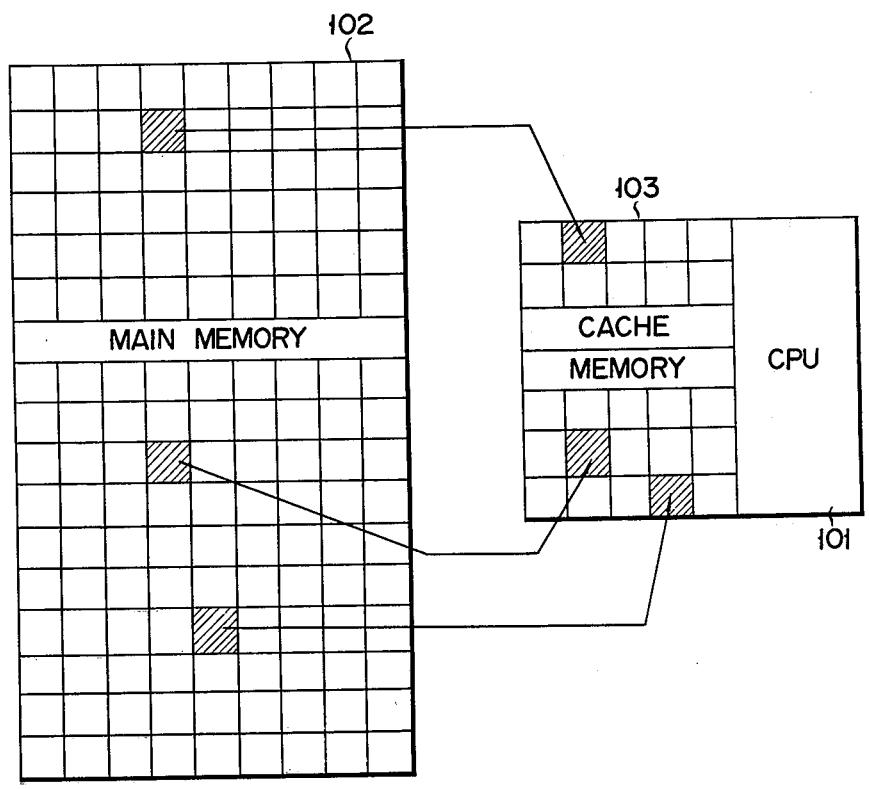
FIG. 1 shows relative memory locations between a main memory and a cache memory.
Figure 2:
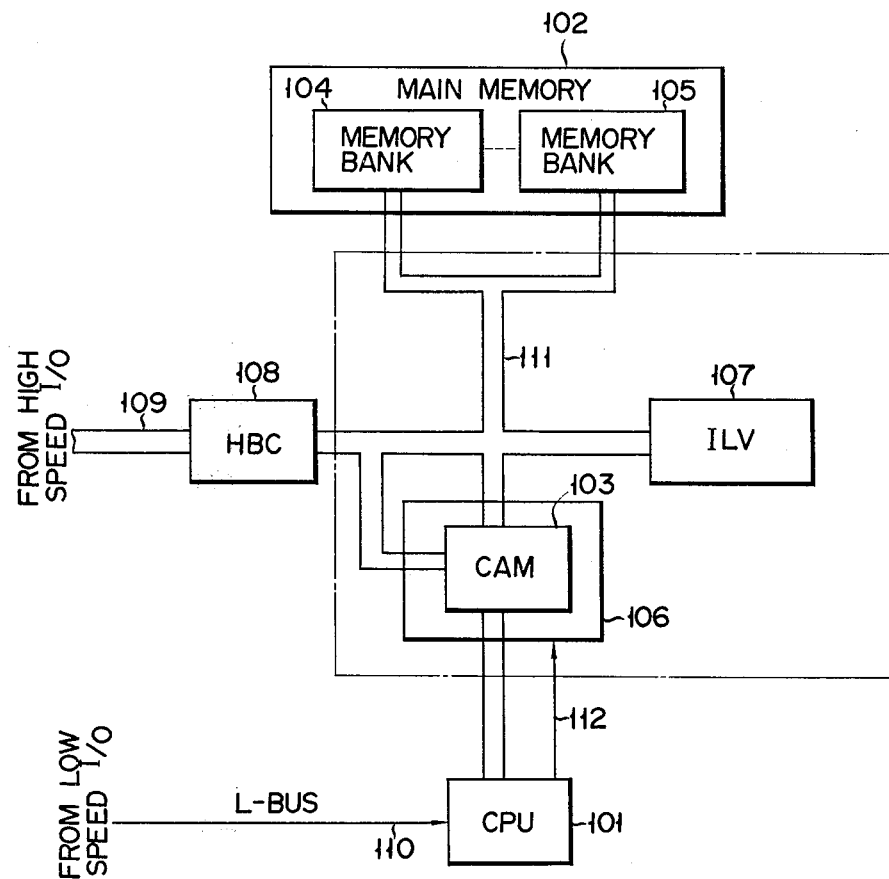
FIG. 2 shows a block diagram of an embodiment of cache memory control system according to the invention.

Referring now to FIG. 2, there is shown an embodiment of a cache memory control system according to the invention. In the figure, a main memory 102 is comprised of a number (in this example, 1024 bytes) of memory banks 104 and 105 and stores instructions and data. A cache memory 103 is connected through a cache memory control portion 106 to the main memory 103 and temporarily stores data to be loaded or read out to and from the main memory 102. An interleave control circuit 107 periodically refreshes the main memory 102. A H-BUS control circuit (HBC) 108 controls a high speed bus (H-BUS) connected to a DMA (direct memory access unit) (not shown). A low speed input/output unit is connected through a low speed bus (L-BUS) to CPU 101. Internal buses 111 interconnects CPU 101, main memory 102, interleave control circuit 107 and H-BUS control circuit 108.

When data is read out from CPU 101 and DMA, the contents of the main memory 102 and the cache memory 103 are always coincident to each other.

The access modes for making an access to the main memory 102 will be given below:

(I) CPU 101 makes an access to the main memory 102.

When data with an address specified is stored in a cache memory, unless it is read out, 16 bytes data including its address is read out from the main memory 102 and then is written into the cache memory 103 while at the same time data with the specified address is sent out to CPU 101.

(II) CPU 101 writes data into the main memory 102.

When the cache memory has not a specified address, data from CPU 101 is loaded into the cache memory 103 and also to the main memory 102. When the cache memory 103 has not the specified address, data is written into only the main memory 102.

(III) DMA reads data from the main memory.

Data is read out from only the main memory and not the cache memory. The reason why the cache memory is not referred to, is that, if the cache memory is referred to, an amount of hardware is increased and that, if desired data is not stored in the cache memory, the process to pull out the data from the main memory is complicated, and further that conflict between CPU and DMA increases thereby to decrease the speed of CPU (this is contrary to the object of the invention).

(IV) DMA writes data into the main memory 102.

When a specified address exists in the cache memory 103, data is loaded into the cache memory 103 and also to the main memory 102. When it does not in the cache memory 103, it is loaded into only the main memory 102. In the above cases (I), (II) and (IV), the check as to whether the cache memory has the specified address or not is performed by a directory to be discribed later.

In the case of the mode (I), a read request from CPU 101 includes a read operation in controlling data transfer through the L bus 110. This read operation is performed for making an access to the memory when the contents of the memory is applied to peripheral units such as a line printer (LP), a display unit (CRT) and a card punch (CP). In general, after input/output data is referred to one time, it is a rare case that the data is repeatedly used since then. Accordingly, there is a high probability that there is no data in the cache memory 103.

In the cache memory control system according to the invention, when CPU 101 engages in input/output operation, CPU 101 applies a tag signal 112 indicating that the cache memory is not used is applied to the cache memory control portion 106 and reads out data from the main memory and not from the cache memory.

Figure 3:
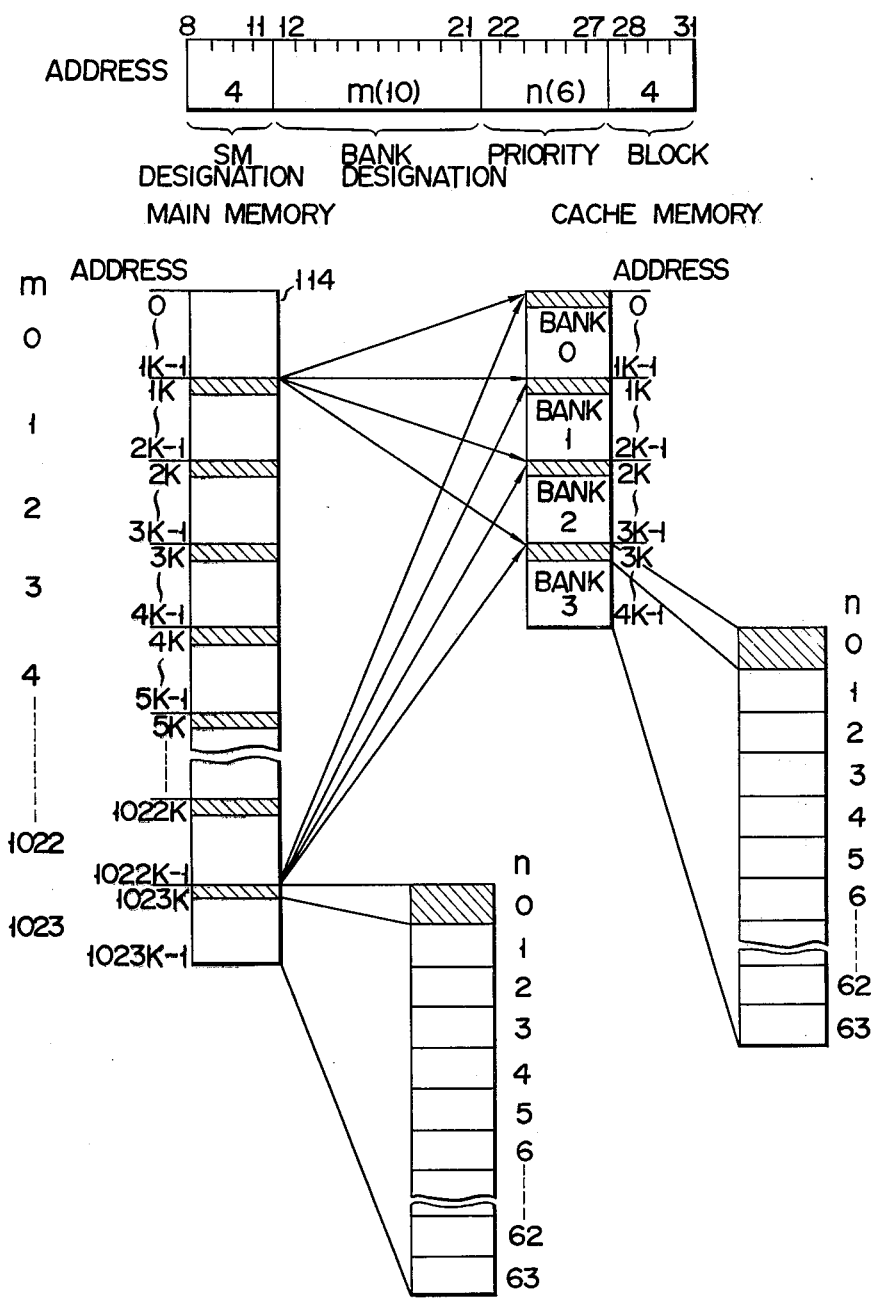
FIG. 3 shows the correspondence between address spaces of a main memory and a cache memory.

Turning now to FIG. 3, there is shown the correspondence between the address spaces of the main memory 102 and the cache memory 103. A read/write request from CPU 101 when CPU 101 makes an access to the main memory 102 includes a memory access request directed to a main memory area (system area)

used as a hardware fixed area. This area is fixedly used by CPU 101 (i.e. the memory location is fixed) and also is used as various types of registers for program status word (PSW) conversion at the interrupt, control word pointer in the input/output control and the like. It is not necessary for the fixed area to be transferred to the cache memory 103. However, it frequently causes a block transfer between the main memory and the cache memory. Accordingly, the data which is once used but will rarely be used in the cache memory and more necessary data is pushed out from the cache memory. The result is that the access efficiency is poor. This is contrary to the object of the invention.

Figure 4:
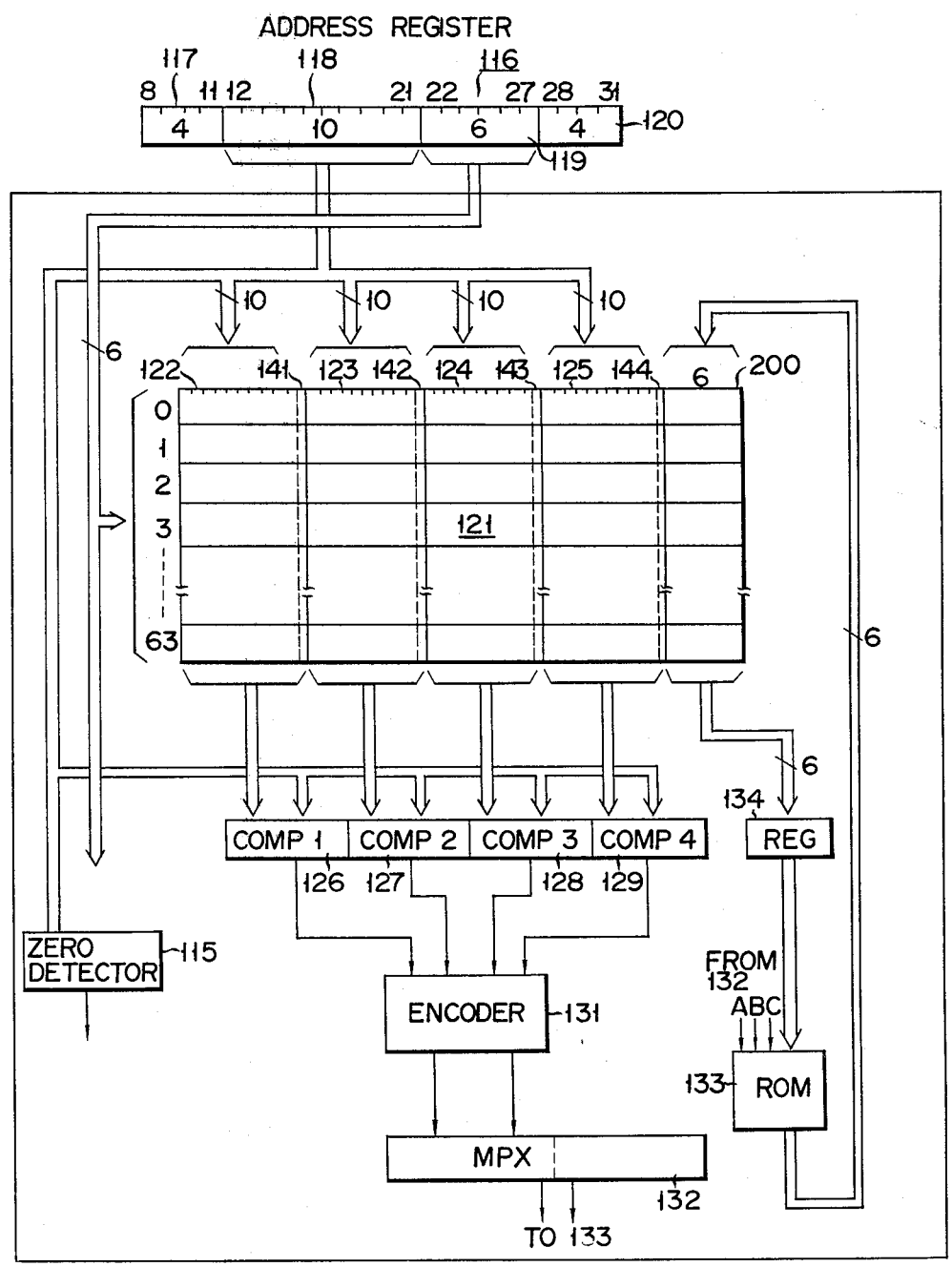
FIG. 4 shows a block diagram of a cache memory control portion.

Therefore, the embodiment of the invention is provided with means by which, when the fixed area is accessed, the cache memory is separated from its access related operation. Incidentally, the fixed area is generally located at the head of the main memory, as indicated by numeral 114 in FIG. 3. As shown, the fixed area ranges from address 0 to address 1K-1, i.e. occupies one 1 K. In order to check as to whether the fixed area is accessed or not, a zero detector 115 is provided in the cache memory control section, as well illustrated in FIG. 4. The cache memory control section will be described in detail later referring to FIG. 4. The zero detector detects whether, when CPU requests data, the specified address is less than 1 K or not. When the address is less than 1 K (1024), bank=0. Accordingly, bits 12 to 21 in an address register 116 in FIG. 4 are all "0". In this manner, it is detected whether the data requested has the address of less than 1 K or not. If it has the address of less than 1 K, a related control signal is produced and data is directly read out from the main memory 102 not by way of the cache memory 103.

As shown in FIG. 3, data transfer between the main memory 102 of 1MB (mega bytes) the cache memory 103 of 4 KB (kilo bytes) is limited in transfer direction to a unidirection from the main memory 102 to the cache memory 103. The data amount at this time is 16 bytes (referred to as a block). The cache memory 103 is quartered into individual sections and each section is called a bank. One bank is constructed by 64 blocks and one block is constructed by 16 bytes. The main memory in apparently 1024 banks. The nth block of each bank in the cache memory 103 contains any one of the nth blocks of each bank. The cache memory control section (often called a directory) which is constructed by a high speed static random access memory is provided in order to judge whether data in the cache memory is usable or not.

The cache memory control section 106, which also is shown in FIG. 2, will be described in detail with reference to FIG. 4. As shown, the address register 116 is constructed by bits 8 to 31, with a shared memory designation field 117 assigned ranging 8 to 11 bits. The field 117 is used when a shared memory is used but is not essential to the invention and therefore no further explanation will be omitted. A bank designation field 118 occupying bit length from bits 12 to 21 designates any one of 1024 banks in the main memory 102. A bit length from bits 22 to 27 is used for a field for designating block addresses (block 0 to block 64) of each bank in the main memory (cache memory), i.e. addresses used as parameters when a directory is referred to. Bits 28 to 31 in the address register 116 are used for the address data of the main memory when the cache memory is hitted (the data requested is present in the cache memory).

A high speed static RAM 121 is divided into four individual banks 122 to 125. First to fourth comparators 126 to 129 are used to compare the output signals from the respective banks 122 to 125 of the RAM 121 with the output signals from the respective banks 122 to 125 of the RAM 121 with the output signal from the bank designation field 118 in the address register 116. The reason why four comparators are used is that the directory is searched with the information (block information) specified by bits 22 to 27 as a parameter, and therefore the information in the four banks 122 to 125 are outputted from the directory. That is, four comparators compare the output information from the four directory with the bank information specified by bits 12 to 21 of the address register 116. An encoder 131, which is connected to the comparators 126 to 129, encode the output signals from the comparators 126 to 129. The signal coded is applied to a control ROM 133 through a multiplexer connecting to the encoder 131. The control ROM 133 is a LRU (least recently used) system control ROM and controls the cache memory 103. The LRU system pushes out the data earliest used from the cache memory and puts new data into the vacant bank in the cache memory. A register 134 temporarily stores the output signal from the high speed static RAM 121, and also latches the address of the control ROM 133. The right most memory area in the directory is the memory area where the output data of the control ROM 133 is stored. This will subsequently be described, together with the control ROM 133, referring to FIGS. 8 and 9. The four output signals from the directory 121, which are addressed by the directly address designation field 119 in the address register 116 and the block information of bits 22 to 27 are outputted to the comparators 126, 127, 128 and 129, respectively. The information from the bank designation field 118 is applied commonly to the comparators 122, 123, 124 and 125. When both the values are coincident to each other, it indicates that desired data exists in the cache memory 103. The flag bits 141 to 144 of the static RAM 121 are also included in the data which is subjected to the comparison in the comparators 126, 127, 128 and 129. Those flag bits 141 to 144 are used to check whether the data at that time is effective or not. When CPU 101 is making an access to the fixed area of the main memory 102, the zero detector 115 produces an output signal and the cache memory 103 has not the address specified. Accordingly, an access to the cache memory is inhibited while only the main memory is accessed.

Figure 5:
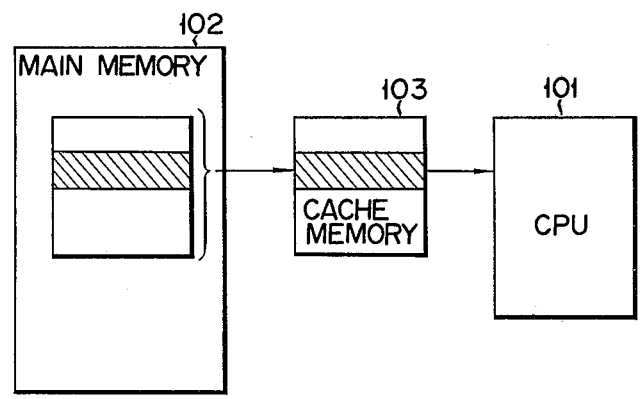
FIG. 5 is a diagram for illustrating a block transfer from a main memory to a cache memory.

The explanation to follow is the elaboration of a case where the cache memory has not the address data specified by CPU. The concept of the operation of this case is illustrated in FIG. 5. When the address data specified by CPU 101 is not included in the cache memory 103, 16-byte signal with the address must be blocktransferred from the main memory 102. In the present invention, the address (the slanted portion in FIG. 5) specified by CPU 101 is read out from the main memory 102 and is transferred to CPU 101. Then, necessary block transfer is performed from the main memory 102 to the cache memory 103 thereby to prevent CPU 101 from stopping its operation (CPU becomes in "wait state").

Figure 6:
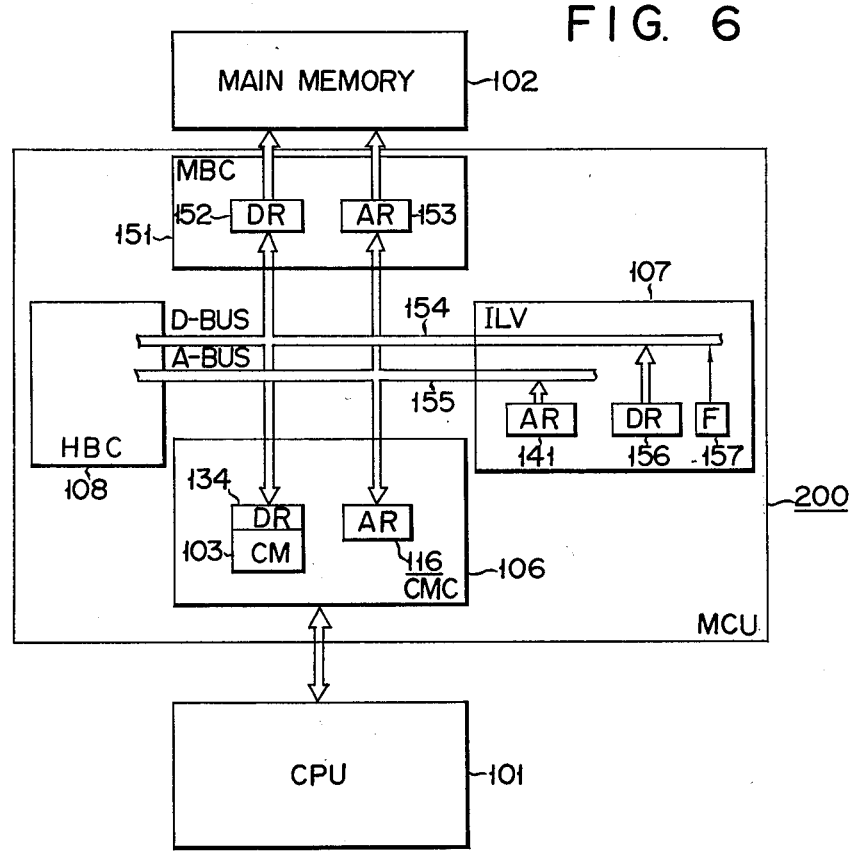
FIG. 6 shows a block diagram of an example for controlling the initialization of a main memory and a cache memory and the refreshing operation of a main memory by the same circuit.

FIG. 6 illustrates in block form the initialization of the main memory or the cache memory, or the refresh of the main memory. As shown, a memory control unit (MCU) 200 is connected between the main memory 102 and the CPU 101. The main memory control unit (MCU) 200 is comprised of a memory bus control portion (MBC) 151, a high speed bus control portion (HBC) 108, an interleave control circuit (ILV) 107 and a cache memory control portion (CMC) 106. The memory bus control portion 151 is connected to the main memory 102, through an address register 153 and a data register 152. The high speed control portion 108 is connected to an interleave control circuit 107 through the high speed bus control portion 108 is connected to an interleave control circuit 107 through a data bus (D-BUS) 154 and an address bus (A-BUS) 155, and further to the memory bus control portion 151 and the cache memory control portion 106. In the interleave control circuit 107, the address bus 155 is connected to an address register 141, a data register 156 is connected to the data bus 154 and a flag register 157 is connected to the memory bus control portion 151. The flag register 157 is set until the initializing is completed after the power source of the memory control unit 200 is turned on. The cache memory portion 106 is connected to the memory bus control portion 151, through a data register 134 and an address register 116. When a power source is applied to the memory control unit 200, the address register 141 is first reset, and then the flag register 157 is in a set state. This indicates that the memory control portion 200 is in an initializing mode. The address register 141 is counted up during a fixed period. When the memory control unit 200 is in the initializing mode, the output signal from the address register 141 is applied to the memory bus control 151 and the cache memory control portion 106. Data to be loaded into the main memory 102 and the cache memory 103 is sent onto the data bus 154 and then is loaded into the memories 102 and 103. When the address register 141 completes the count-up operations, the flag register 157 is reset. When the flag register 157 is reset, the address register 141 performs the count operations for a fixed time. The address register 153 counts responsive to the output of the register 141 for the memory refresh. The output signals from the address registers 141 and 153 are used as refresh addresses to refresh the main memory 102 constructed by a dynamic RAM. In the invention, the initialization of the main memory 102 and the cache memory 103 and the refreshing operation are carried out by the same circuit.

Figure 7:
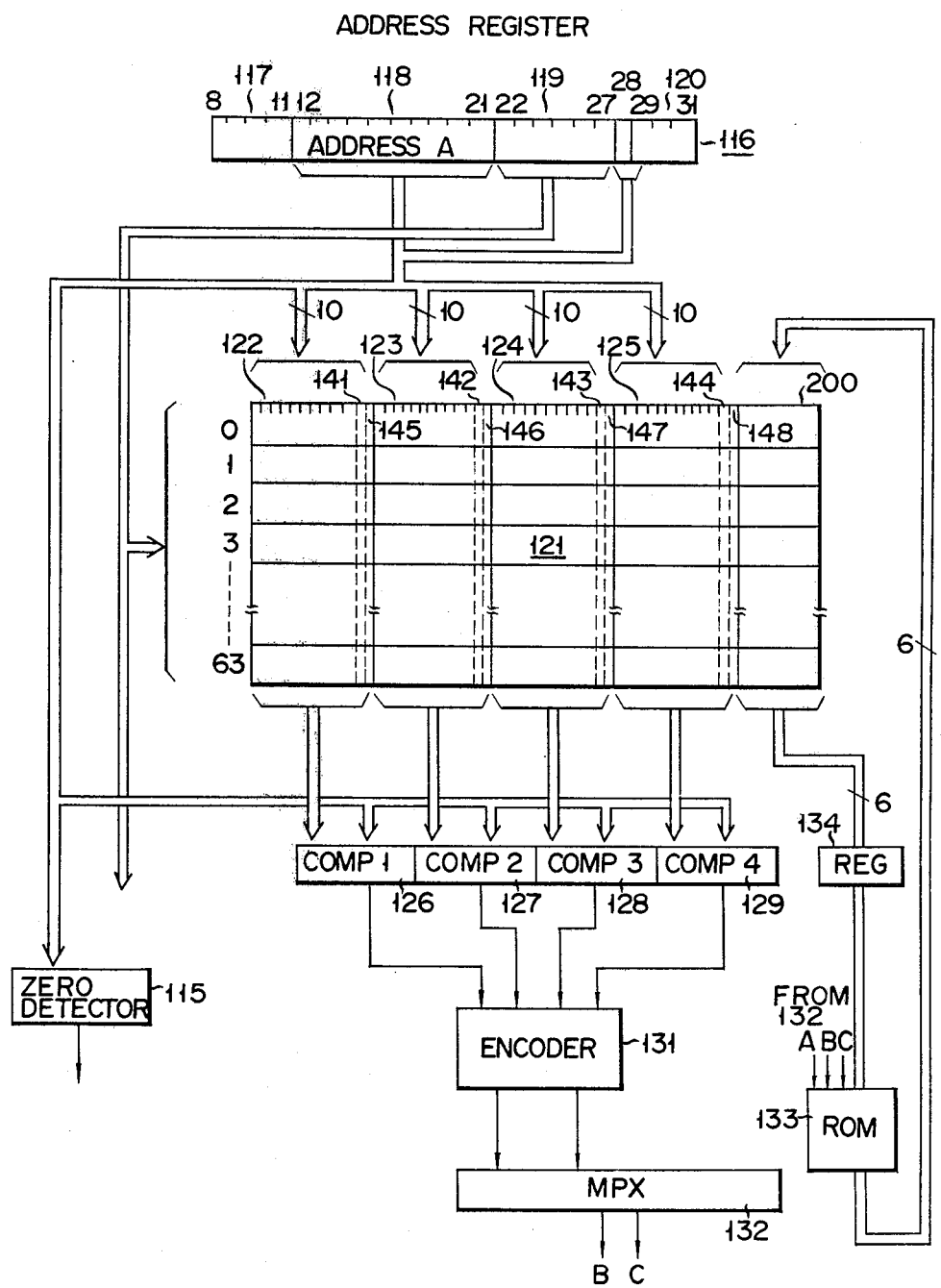
FIG. 7 shows a block diagram of a circuit for making variable the size of a transfer block.

FIG. 7 shows a control block for varying the size of a transfer block to the cache memory 103. The size of the block transferred from the main memory 102 to the cache memory 103 is 16 bytes. In the figure, two bits 145 to 148 are additionally attached to the flag bits 141, 142, 143 and 144, respectively. The two bits 145, 146, 147 and 148 are obtained from the bit 28 in the address register 116.

The address register may have the following three states: (a) the part A in the specified address 118 is constant and an address "1" is registered in the bit 28 $(1,X)_2$ (a letter attached "2" indicates a binary number system and X indicates the contents of the directory before rewritten); (b) an address "0" is registered in the bit 28 $(X,1)_2$; (c) nothing is registered in the bit 28 $(00)_2$. The diagrammatically illustration of the essential part of this state is as illustrated below:

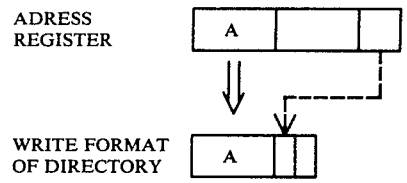

When a memory access request (main memory read) from CPU 101 reaches the address register 116, it is checked if the address is registered in the directory 21 or not, on the basis of the output signals from the comparators 126, 127, 128 and 129. If the address exists in the directory 121, desired data is read out from the cache memory 102. On the other hand, if the not-coincident signals are produced from the comparators, the earliest block to be pushed out from the cache memory by the LRU method is decided and one block (16 bytes) in the bank is pushed out therefrom. Then, 8-byte data including the specified address is written from the main memory 102 into the cache memory and sends necessary data to CPU. When a memory access request (main memory write) from CPU raches the address register 116, it is first checked if the address thereof is registered in the directory 121 or not. If the address exists in the directory 121, the data to be loaded is loaded into the cache memory 103 and also to the main memory 102. If the address does not in the directory 121, the data is loaded into only the main memory 102.

Figures 8, 9:
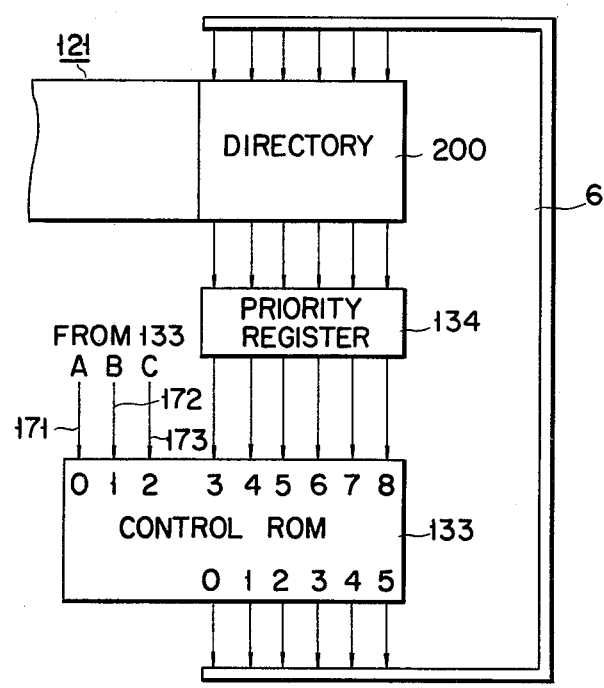
FIG. 8 shows a block diagram for determining a priority order of four memory banks in a cache memory control portion (directory)
FIG. 9 tabularly illustrates input data to the control ROM and the output data thereof.

When a new block is written from the main memory into the cache memory, an earlier used block must be removed from the cache memory. This operation will be described with reference to FIGS. 8 and 9. In FIG. 8, like numerals are used to designate like portions in FIG. 7, with omission of these parts. Applied to the control ROM 133 is a initial write flag signal 171 and encoder outputs (2 bits are necessary because of 4 banks of directory) 172 and 173 from the multiplexer 132.

In case where CPU 101 provides an address, and the directory 121 is referred to by the address data and the reference shows a coincidence, the priority order of the directory 121 must be changed in synchronism with the reading operation from the cache memory 103, before the address of the directory is changed. The directory changed at this time corresponds to the portion 200 connecting to the register 134. The output signal from the directory 121 is applied as an address input of the control ROM 131 to the bits 3 to 8 thereof. The outputs of the ROM 133 are as illustrated in FIG. 9. In the figure, A of ABC012345 in the ROM address designates an initializing signal; B and C output signals from the multiplexer 132; 3 to 8 the output signal from the memory area 200 in the directory 121. When the address A is "1" (i.e. in the figure, No. 1), the output signals of ROM becomes 000110 irrespective of the contents of B, C, 0, 1, 2, 3, 4, 5. The 6-bit output is applied to the memory area 200 in the directory 121. In No. 2, the control ROM 133 is accessed with the address of the data set in the memory area 200. That is, the value corresponding to the ROM address 0, 1, 2, 3, 4, 5 becomes 000110. The data read out of the address is 011011. Succeedingly, data in the ROM 133 is read out in a similar manner. Firstly, to initialize the cache memory, the initial write flag 171 is set to initialize the cache memory 103 and the directory 121. At this time, the address of the directory 121 is designated as indicated by No. 1 in FIG. 9. The priority order of the directory 121 is $\boxed{00}$, $\boxed{01}$, $\boxed{10}$. This means that $\boxed{00}$, $\boxed{01}$, $\boxed{10}$ designate banks, respectively: $\boxed{00}$ designates a bank 122; $\boxed{01}$ a bank 123; $\boxed{02}$ a bank 124; $\boxed{03}$ a bank 125. In this example, $\boxed{00}$ is at the lowest priority order. After the completion of the initial write, when the first memory access request comes in, since the cache memory control portion has not the corresponding address, data is read out from the main memory 102 and is written into the data register (DR) 134 of the CMC 106 while at the time the data at the specified address is sent out to CPU. At this time, the contents of the directory 121 is renewed. At this stage, since there is not data to be preferentially treated, the data fetched from the main memory 102 is written into the bank with the lowest priority, i.e. the cache memory corresponding to the bank 122. The writing of data into cache memory is performed in the following cases: data specified in the read operation from CPU101 is not included; in the cache memory data specified in the write operation from CPU 101 is included in the cache memory; the address specified in the write operation from H-BUS is included in the cache memory. This example corresponds to the foremost case so that data is loaded into the bank with the lowest priority bank. Incidentally, the read operation from the cache memory is performed independently of the priority order. As a result, $\boxed{00}_2$ is at the highest priority and the contents of $\boxed{01}_2$, $\boxed{10}_2$ and $\boxed{11}_2$ are renewed in this order and those become as shown in No. 2 of FIG. 9. As in the previous case, when the same address is specified in the directory 121, since the outputs of the control ROM 133 at this time have been $\boxed{01}_2$, $\boxed{10}_2$, $\boxed{11}_2$, data from the main memory is written into a $\boxed{01}_2$ bank, that is, the bank 123 is FIG. 7. This operation is repeated succeedingly.

The memory write will be described. When data is written into both the main memory and the cache memory, a memory cycle as viewed from CPU has been made to coincide with the memory cycle of the main memory, even though the memory cycle to the cache memory is higher. In this example, the memory cycle is made to coincide with the memory cycle of the cache memory to improve the efficiency of the memory cycle.

Figure 13:
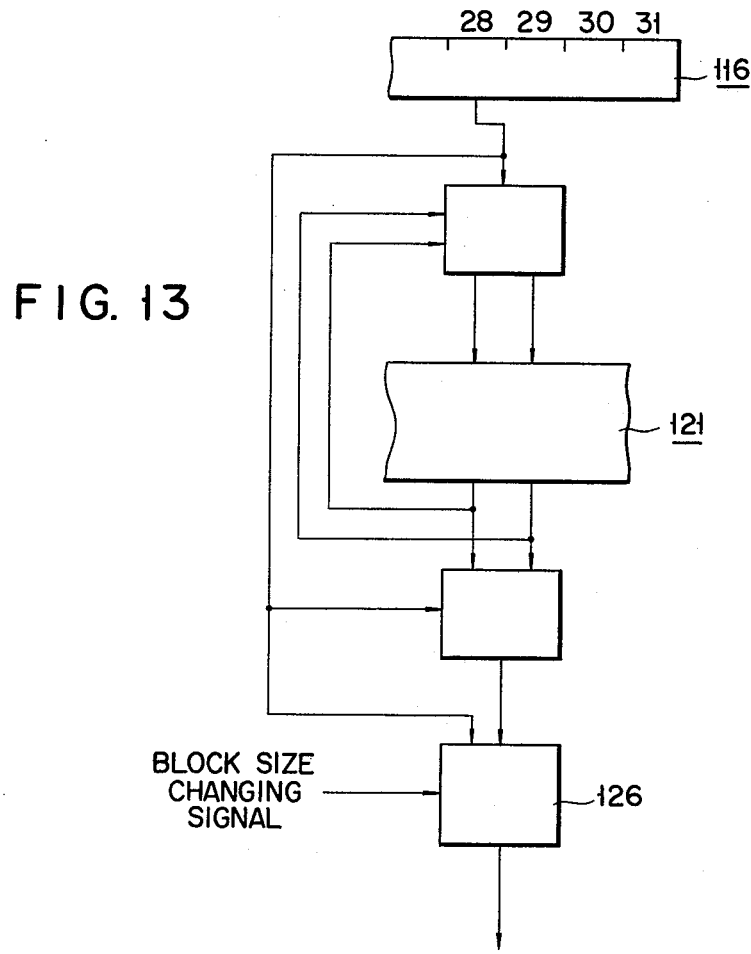
FIG. 13 shows a block diagram of a block size switching circuit.

Switching of the transfer block size will be described in detail referring to FIG. 13.

The two bits (A, B) are allocated on the directory corresponding to the bit 28. When the bit 28 is "1", the bits (A, B) are written as (1, B'). When the bit 28 is "0", the bits (A, B) are written as (A', 1).

When A=1 and the bit 28 is "1", or when B=1 and the bit 28 is "0", it is indicated that the data is registered in the cache memory.

When the data is set in the address register 116, the contents of bit 12 to bit 21 is compared with the contents of the directory and also with the contents of the bit 28 at the same time. If both coincidence, the former one and the latter one have occured, the desired address is in the cache memory and the data is read out from the cache memory.

If the coincidence of the former is obtained and the coincidence of the latter is not obtained, the area is allocated but the desired address is not in the cache memory. In this case 8 byte data is transferred to the cache memory corresponding to the bank coincident with the former.

If both the former and the latter coincidence is not obtained, 8 byte data is transferred from memory to the cache memory corresponding to the bank followed by the LRU control.

Figure 10:
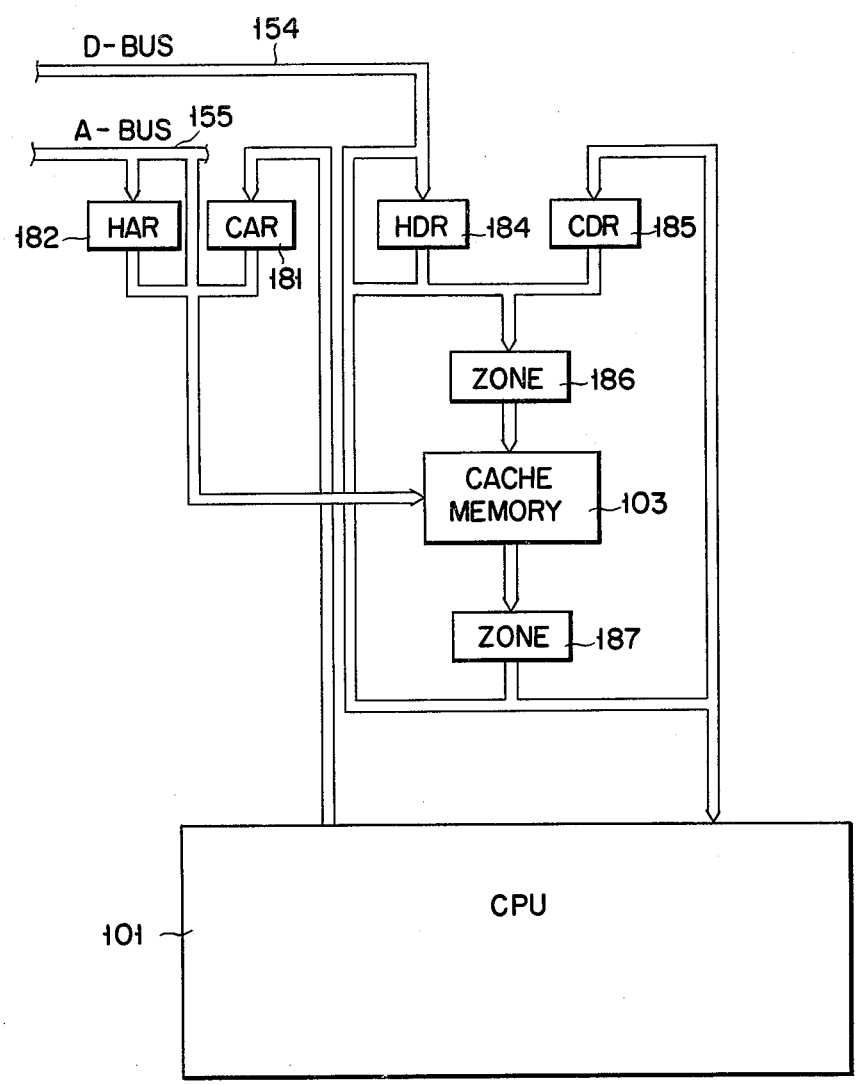
FIG. 10 shows in block form a cache memory and its periphery portion.

Reference is made to FIG. 10 illustrating the cache memory and its peripheral circuit. An address register HAR 182, which is connected to an address bus A-BUS 155 and the cache memory 103, temporarily stores data on the address bus and produces its output for transmission to the cache memory 103. The address register CAR 181 intervening between CPU 101 and the cache memory 103 also temporarily stores the address transmitted from CPU and produces an output signal for transmission to the cache memory 103. A data register HDR 184 intervening between a high speed data bus 154 and a ZONE 186 temporarily stores data on the high speed data bus 154 and provides an output signal to the cache memory through ZONE 186. A data register CDR 185 connected between CPU 101 and the ZONE 186 registers therein data from CPU 101 and provides an output signal through ZONE 186 to the cache memory 103. The output of the ZONE 187 is transferred only to the CPU 101. ZONEs 186 and 197 are multiplexers to control the zones of the data to be inputted to the cache memory 103 and the data to be outputted therefrom.

When CPU 101 issues a memory write request, and the data to be written and its addresses are registered in the address register CAR 181 and a data register CDR, a memory cycle complete signal is sent from MCU 200 to CPU 101. Simultaneously, the contents of the data register CDR 185 is loaded into the cache memory 103. When the address is not included in the cache memory 103, nothing is written into the cache memory 103. At the time that the cache memory 103 or the main memory 102 still need the contents of the data register, and the contents of the data register is not yet transferred to the main memory, even if a memory write request or a memory read request is issued, CPU 101 continues a "wait" state until destroy of the contents of the data register is allowable.

Figure 11:
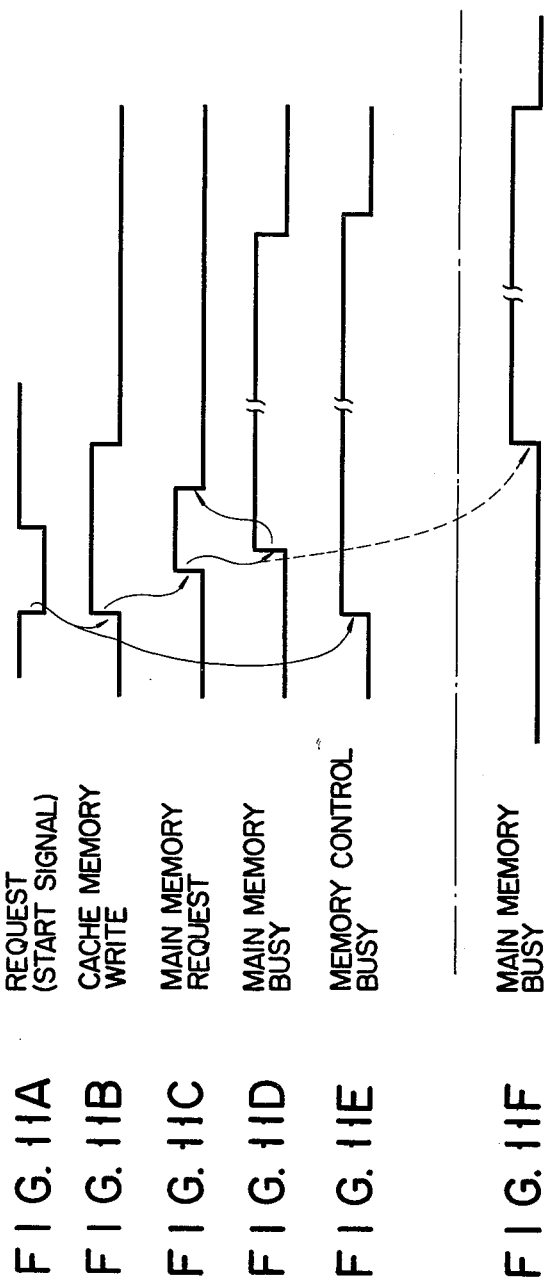
FIG. 11, including 11A-11F, shows a set of waveforms useful in explaining the memory cycle.

FIGS. 4A to 4F show a timing chart when the memory is controlled by the memory cycle of the cache memory. CPU 101 produces a memory request (start signal), as shown in FIG. 11A. As shown in FIG. 11C, a memory control busy signal rises at the leading edge of the start signal, and data write into the cache memory is performed (FIG. 11B). With some delay behind the rise of the cache memory write in FIG. 11B, a main memory request signal rises as shown in FIG. 11C. And then the main memory 102 becomes in "busy" state, as shown in FIG. 11D. When the memory request from CPU 101 conflicts with the memory request from the high speed bus 109, the timing of the main memory busy becomes as shown in FIG. 11F.

Figure 12:
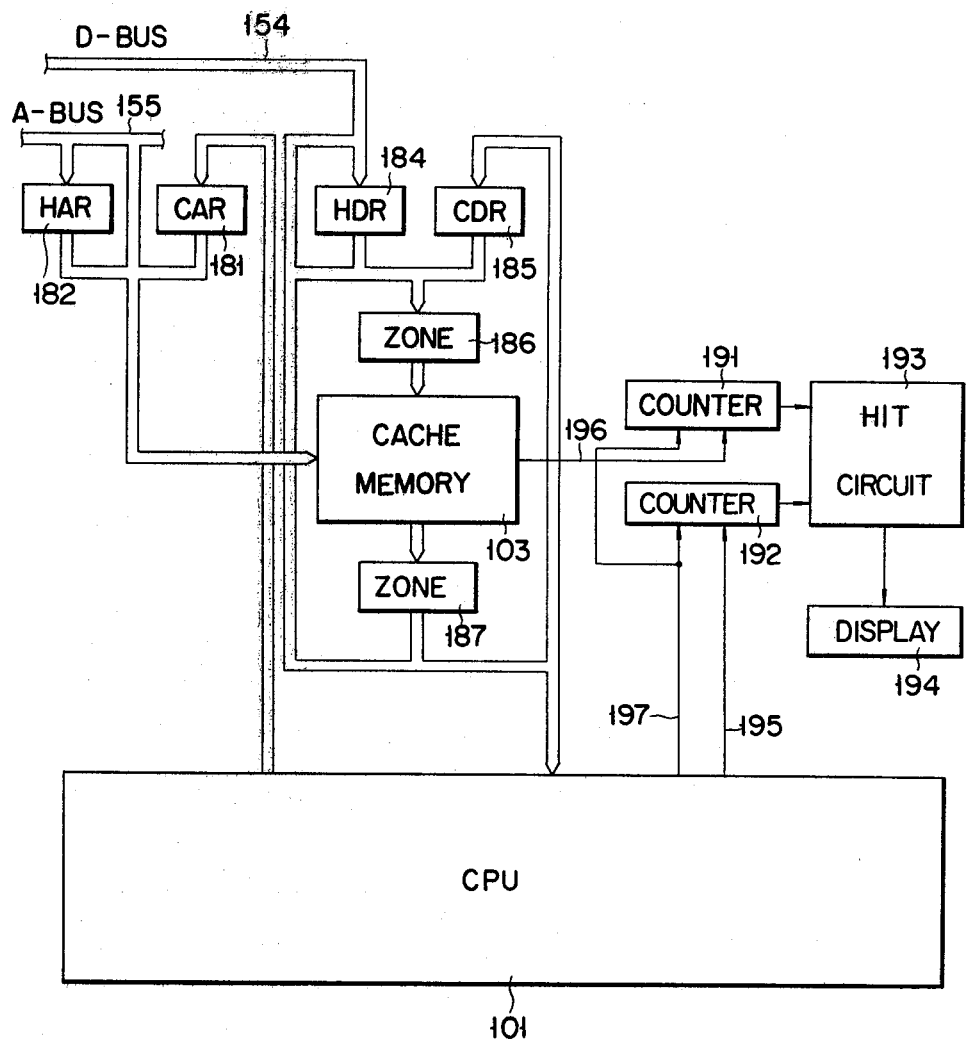
FIG. 12 shows an example of a hit ratio measuring circuit.

Turning now to FIG. 12, there is shown a block diagram of a hit ratio measuring circuit. In the figure, like numerals are used to designate like portions in FIG. 10. Term "hit ratio" means a degree of the exsistance of the data required for the high speed bus 109 and CPU 101 in the cache memory, and is defined Hit ratio $$= \frac{n - \text{(main memory access (READ) time from cache memory)}}{n}$$

where n is a READ request time issued from CPU to the main memory.

A memory access request signal counter 192 connecting to CPU 101 counts a cache memory access request signal (a READ access from the cache memory to the main memory) issued from CPU 101. A main memory access request signal counter 191 connecting to the cache memory 103 counts a main memory access request signal 196 produced from the cache memory 103. Both the counters 191 and 192 are reset by a counter reset signal 197 produced from CPU 101. Both the counters 191 and 192, connected to a hit circuit 193, applied the output signals to the same. The hit circuit 193 calculates a hit ratio (the ratio of the main memory) access to memory access request time) which in turn is applied to a display circuit 194 connected to the hit circuit 193.

The counters 191 and 192 are reset by a counter reset signal produced by CPU 101. For a desired address and a write operation, when data with located at a desired address is written in the memory, CPU requests a memory access with data. The memory access request signal is counted by the counter 192. When a desired address is not included in the cache memory 103, the cache memory 103 produces a main memory access request signal 196 which is counted by the counter 191. The output signals from both counters 191 and 192 are applied to hit circuit 193 where a hit ratio is calculated.

In the embodiment according to the invention, when is performing an input/output operation for a memory access request from CPU, a tag signal is set and the cash memory is not used. Accordingly the hit ratio to the cache memory is improved and therefore the cache memory is effectively used. Since the cache memory is not used, a memory access time is reduced.

When an input/output unit makes an access to the main memory, the provision of a flag permits that, when the flag rises, data may be directly transferred between the main memory and the input/output unit. Therefore, the cache memory is effectively used. The cache memory control system according to the invention is provided with a zero detector which indicates, when CPU accesses to the fixed area of the main memory, that the access is a fixed memory area access. Therefore, in such a case, the cache memory is not used so that the memory access is improved.

In the case of the memory access from CPU, if the data at the specified address is not included in the cache memory, the data of the specified address is first transferred from the main memory to CPU and then a block including the specified address data is transferred. Therefore, a cease time (a wait time of CPU) of CPU is shortened.

Additionally, a single circuit initialize the main and cache memories and may refresh the main memory constructed by a dynamic RAM. This eliminates a control circuit for executing such functions, leading to simplification of the circuit construction and reduction of its cost. In the cache memory control system, the size of the block transferred from main memory to the cache memory may be either 16 bytes or 8 bytes. Accordingly, the cache memory is flexibly used to improve the execution efficiency of the cache memory. The provision of the directory, particularly, the control ROM, permits data to be taken out from the cache memory. This also brings about an effective use of the cache memory. A circuit for measuring a hit ratio of the cache memory is provided in the cache memory control system. Therefore, a range to be measured may be specified by a program so that the hit ratio may be calculated more precisely.

What we claim is:

1. A cache memory control system for a data processing system with a memory system to be accessed by a central processing element and a high speed bus control circuit, comprising:

main memory means with a plurality of word locations addressable by addressing spectra in which the entire of the word locations are logically divided into a plurality of banks, each bank is divided into a plurality of blocks, each block is divided into a plurality of word locations, and each bank is specified by a bank address in the addressing spectra each block by a block discriminator and, each word location by a block address;

cache memory means with a plurality of word locations addressable by addressing spectra in which the entire of the word locations are logically divided into a plurality of bank corresponding to the respective bank in said main memory, each bank is divided into a plurality of blocks, each block is divided into a plurality of work locations, and each bank is specified by the bank address in the spectra, each block by the block discriminator, and each word location by the block address;

random access director memory means which is addressable by the bank address, is provided with a plurality of work locations corresponding to the banks in said cache memory, and loads the block discriminators of a plurality of blocks in the corresponding banks stored in said cache memory; a cache memory address bus connecting to said central processing element, said high speed bus control circuit, said cache memory and said directory memory, for transferring the address information of the fetch request produced by the processing element or the high speed bus control circuit;

comparing means connecting to said directory memory and said address bus, which said comparing means compares a plurality of discriminators read out from said directory memory in response to the bank address of the fetch request with the block discriminator of the fetch request to produce coincident or not-coincident signal for indicating whether the word to be fetched is stored in said cache memory;

encoder means connecting to said comparing means for encoding the coincident not-coincident signals;

a multiplexer connecting to said encoder for selecting said encoder signal;

control ROM means connecting to said priority register for applying to said directory memory the directory memory bank information to which data is to be loaded, in response to the output signal from said priority register;

and zero detecting means connecting to said address register for prohibiting block transfer from said main memory to said cache memory when memory address information fed from said address register specifies a fixed area in said main memory.

2. A cache memory control system according to claim 1, further comprising:

a first address register means, connected between said address bus and said cache memory means, for registering therein the data on said address bus and producing an output for transmission for said cache memory means;

a second address means, connected between said central processing element and said cache memory means, for registering therein an address sent from said central processing element and producing an output signal for transmission to said cache memory;

a first data register means, connected through said high speed data bus and a first zone control means to said cache memory, for registering therein data on said high speed data bus and produces an output signal for transmission to said cache memory means through said first zone control means; and a second data register means, connected between said central processing element and said zone control means, for registering therein data delivered from said central processing element and produces an output signal for transmission to said cache memory through said first zone control means in order that the output signal from said cache memory means is transferred through a second control means to said central processing element and said first data register means.

3. A cache memory control system according to claim 1, further comprising a hit ratio measuring circuit, intervening between said cache memory means and said central processing element, for measuring a degree of the existence of the data requested by said central processing element in said cache memory.

4. A cache memory system according to claim 3, in which said hit ratio measuring circuit includes:

a first counter connecting to said central processing element for counting data request signal from said central processing element;

a second counting means connecting to said cache memory means for counting the output signal produced from said cache memory when request data from said central processing element is not included in said cache memory;

a hit ratio calculating circuit means connecting said first and second counter means for calculating a hit ratio on the basis of the output signal from said first and second counter means; and a display means connecting to said hit ratio calculating circuit means for visualizing the output signal from said circuit.

* * * * *

UNITED STATES PATENT AND TRADEMARK OFFICE
CERTIFICATE OF CORRECTION

PATENT NO. : 4,219,883

DATED : 8/26/80

INVENTOR(S) : Yoshiuki Kobayashi and Takashi Rokutanda

It is certified that error appears in the above—identified patent and that said Letters Patent is hereby corrected as shown below:

Col. 1, line 12, change "filed" to --field--.

Col. 1, line 61, change "CUP" to --CPU--.

Col. 4, line 32, delete the comma between "ferred" and "to".

Col. 4, line 41, after "not" insert --exist--.

Col. 4, line 45, change "discribed" to --described--.

Col. 4, line 60, delete "is applied".

Col. 7, line 67, change "diagrammatically" to --diagrammatical--.

Col. 8, line 3, change "ADRESS" to --ADDRESS--.

Col. 8, line 30, after "does not" insert --exist--.

Col. 9, line 34, change "is" to --in-- (second occurrence).

UNITED STATES PATENT AND TRADEMARK OFFICE
CERTIFICATE OF CORRECTION

PATENT NO. : 4,219,883
DATED : 8/26/80
INVENTOR(S) : Yoshiuki Kobayashi and Takashi Rokutanda It is certified that error appears in the above—identified patent and that said Letters Patent is hereby corrected as shown below:

Col. 9, line 56, change "coincidence" to --coincide--.

Col. 9, line 57, change "occured" to --occurred--.

Col. 10, line 38, change "destroy" to --loading--.

Col. 10, line 52, change "busy" to --bus--.

Col. 10, line 57, change "exsistance" to --existance--.

Col. 11, line 15, delete "with".

Col. 11, line 25, delete "is performing".

Col. 11, line 26, after "CPU" insert --is being performed--.

Col. 11, line 26, change "cash" to --cache--.

Signed and Sealed this

Third Day of February 1981

[SEAL]

Attest:

RENE D. TEGTMEYER

Attesting Officer

Acting Commissioner of Patents and Trademarks